Figure 1:
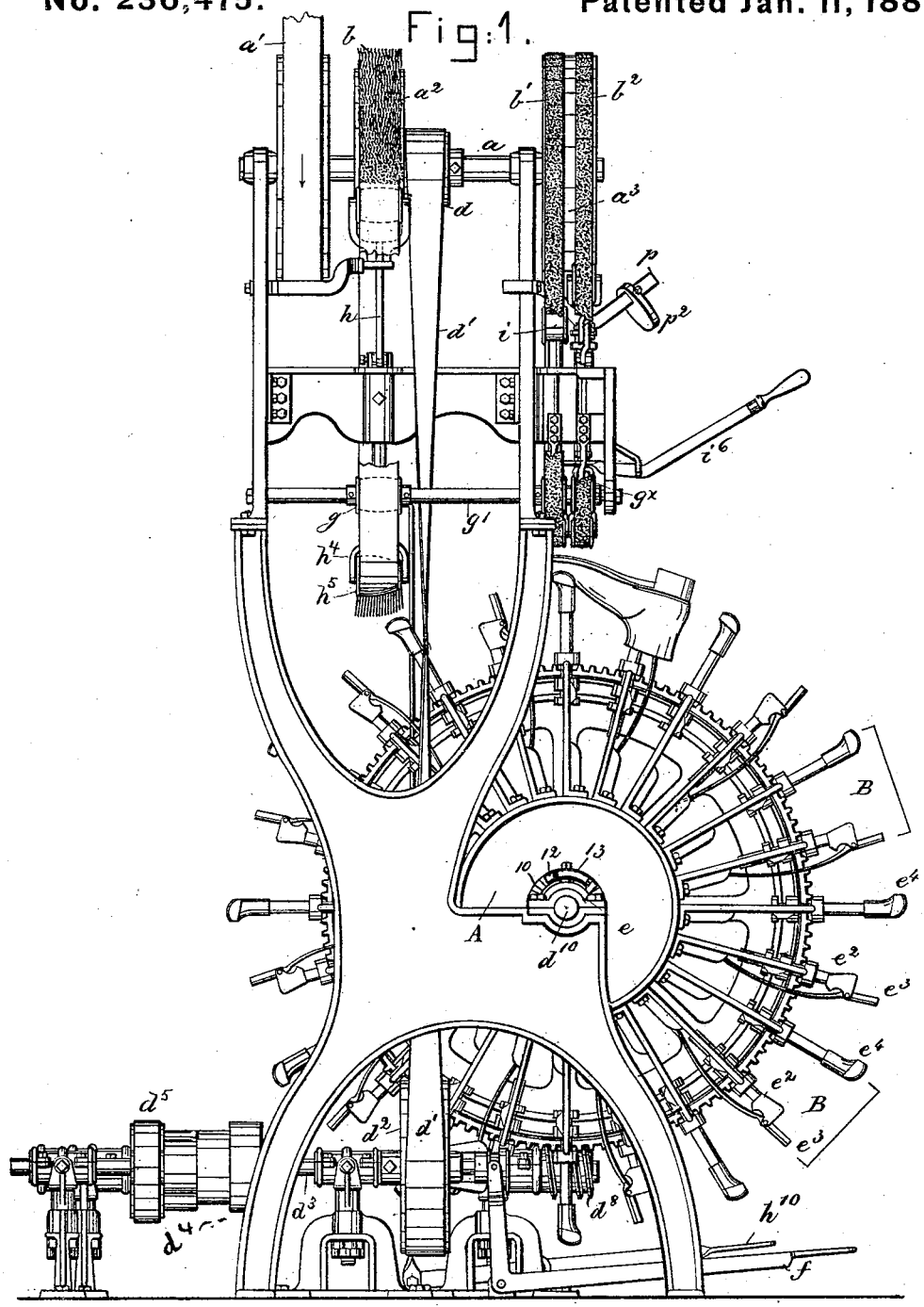

(No Model.) 6 Sheets—Sheet 1.

J. A. & A. C. AMBLER.
Mechanism for Finishing the Bottoms of
Boots and Shoes.

No. 236,475. Patented Jan. 11, 1881.

Witnesses. Inventors.

(No Model.)  6 Sheets—Sheet 2.

J. A. & A. C. AMBLER.
Mechanism for Finishing the Bottoms of Boots and Shoes.

No. 236,475.  Patented Jan. 11, 1881.

Witnesses.
Arthur Reynolds
Bernice J. Noyes

Inventors.
James A. Ambler
Artemas C. Ambler
by Crosby & Gregory
Attys (No Model.) 6 Sheets—Sheet 3.

J. A. & A. C. AMBLER.
Mechanism for Finishing the Bottoms of Boots and Shoes.

No. 236,475. Patented Jan. 11, 1881.

Witnesses.
Arthur Reynolds.
Bernice J. Noyes.

Inventors.
James A. Ambler
Artemas C. Ambler
by Crosby & Gregory
Attys.

(No Model.) 6 Sheets—Sheet 4.
J. A. & A. C. AMBLER.
Mechanism for Finishing the Bottoms of
Boots and Shoes.
No. 236,475. Patented Jan. 11, 1881.
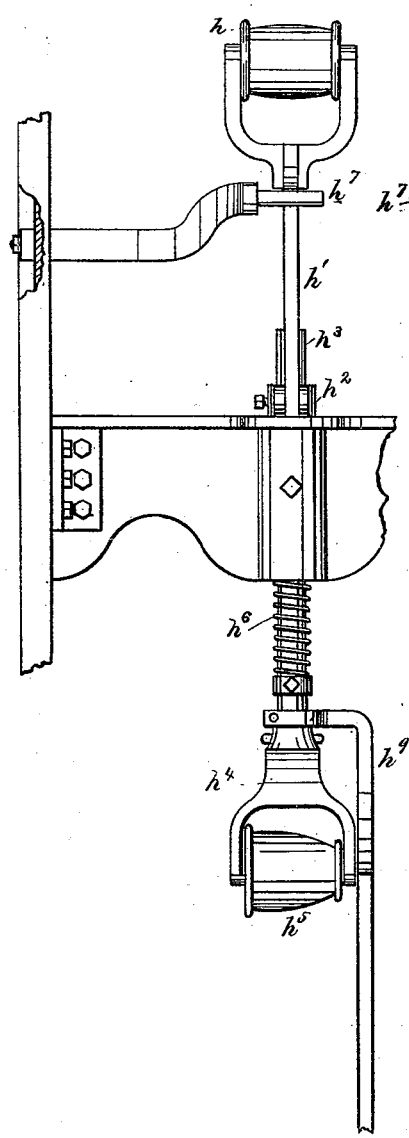
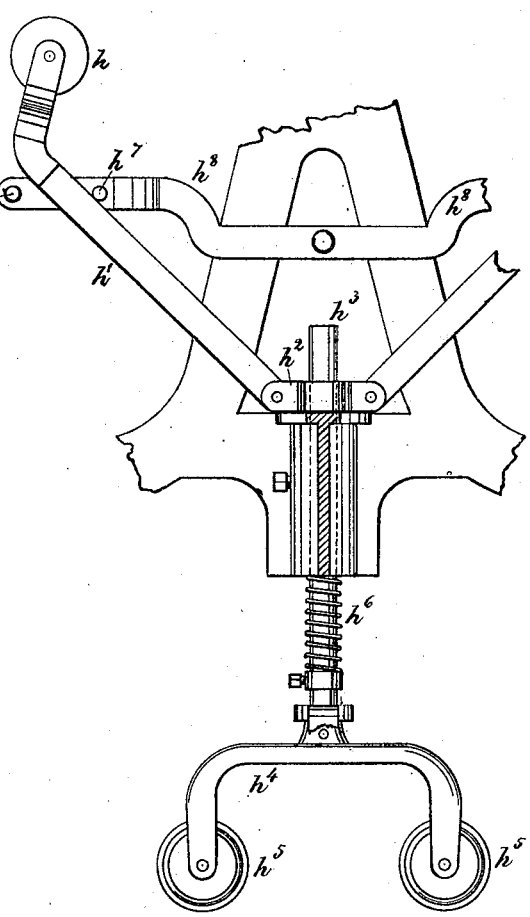
Witnesses.
Arthur Reynolds
Bernice J. Noyes
Inventors.
James A. Ambler
Artemas C. Ambler
by Crosby & Gregory Attys.

(No Model.) 6 Sheets—Sheet 5.
J. A. & A. C. AMBLER.
Mechanism for Finishing the Bottoms of Boots and Shoes.
No. 236,475. Patented Jan. 11, 1881.
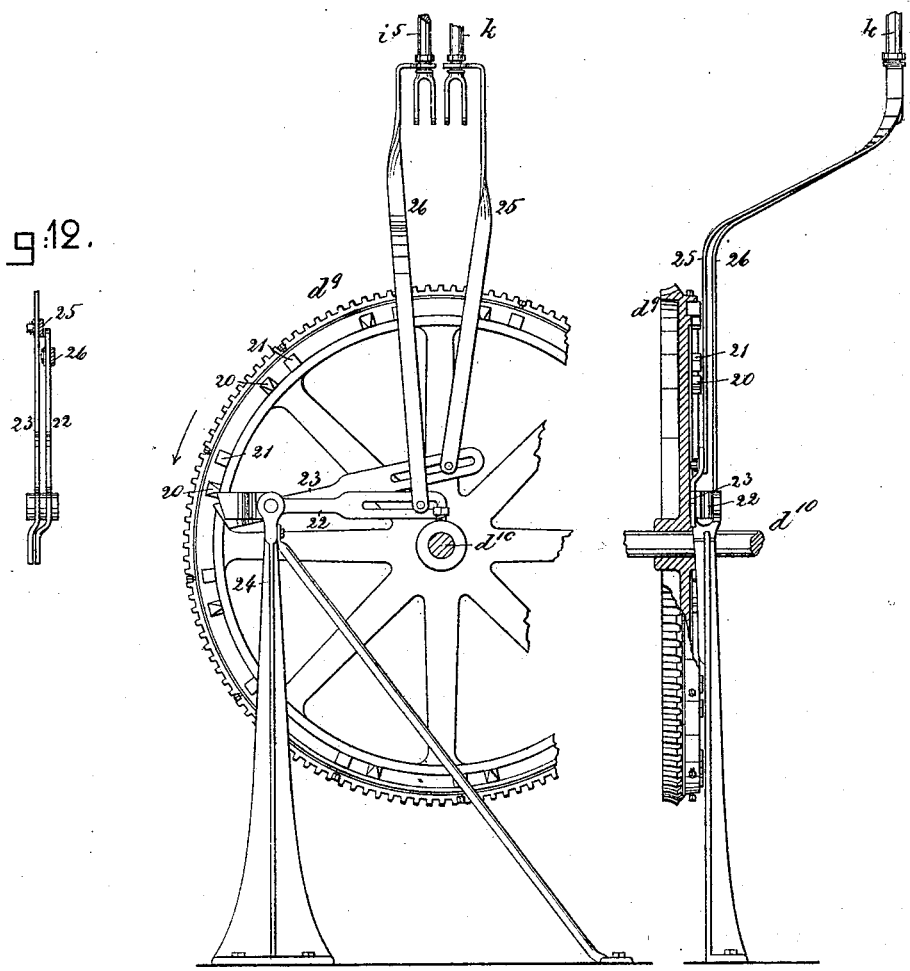

(No Model.) 6 Sheets—Sheet 6.
J. A. & A. C. AMBLER.
Mechanism for Finishing the Bottoms of Boots and Shoes.
No. 236,475. Patented Jan. 11, 1881.
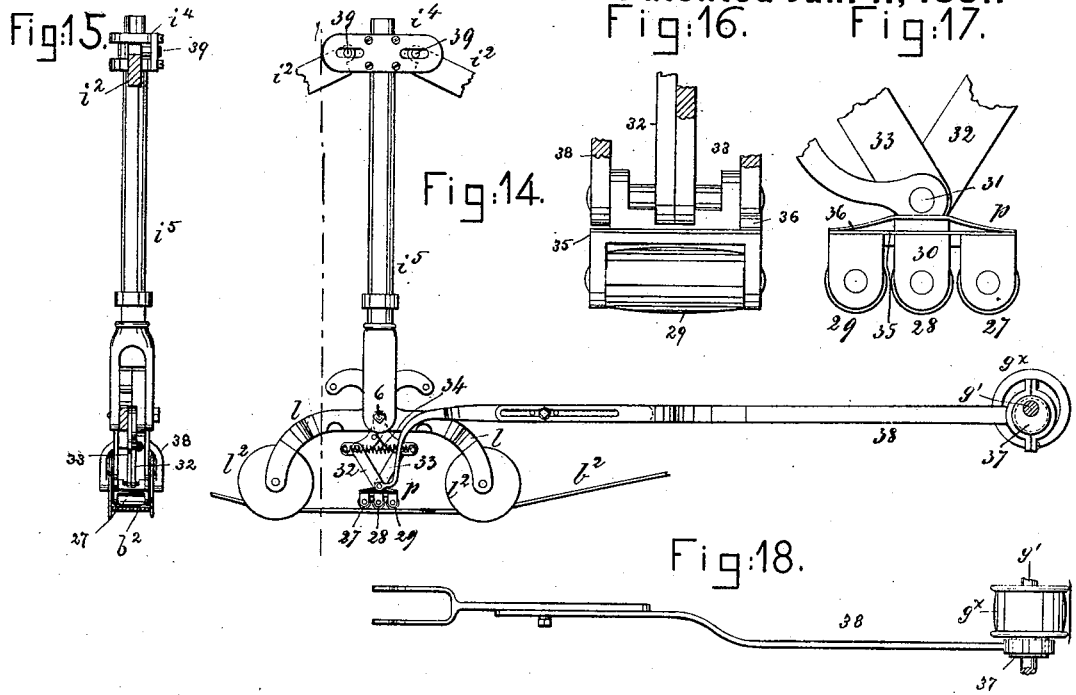
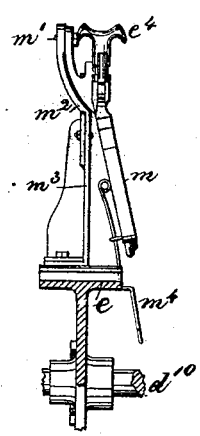
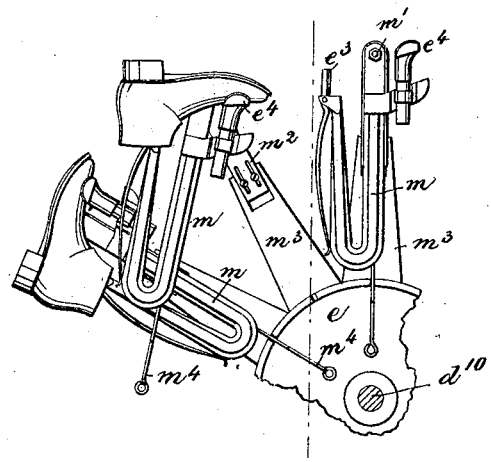
Witnesses.
Arthur Reynolds
Bernice J. Noyes
Inventors.
James A. Ambler
Artemas C. Ambler
by Crosby Gregory Attys

UNITED STATES PATENT OFFICE.

JAMES A. AMBLER AND ARTEMAS C. AMBLER, OF NATICK, MASSACHUSETTS; SAID ARTEMAS C. AMBLER ASSIGNOR TO SAID JAMES A. AMBLER.

MECHANISM FOR FINISHING THE BOTTOMS OF BOOTS AND SHOES.

SPECIFICATION forming part of Letters Patent No. 236,475, dated January 11, 1881.

Application filed October 15, 1880. (No model.)

*To all whom it may concern:*

Be it known that we, JAMES A. AMBLER and ARTEMAS C. AMBLER, of Natick, county of Middlesex, and State of Massachusetts, have invented Improvements in Mechanism for Finishing the Bottoms of Boots and Shoes, of which the following description, in connection with the accompanying drawings, is a specification.

This invention relates to mechanism for finishing the soles or bottoms of boots and shoes, and is an improvement on United States Letters Patent No. 232,323, September 21, 1880, to which reference may be had. In that machine the sole of the boot or shoe was held in a sliding frame and was moved forward and backward automatically to be acted upon by an endless belt to abrade and clean the bottom of the sole. In this present invention we employ a series of jacks which are moved forward, and the soles of the boots or shoes held thereon are progressively acted upon by the abrading and finishing or polishing belts under control of bearing-rollers which govern the pressure of the belts upon the sole and the relative position of the lower faces of the belts with relation to the level of the bottom of the sole, whereby the belts are properly adapted to soles of different sizes and of varying widths and curvatures.

Figure 2:
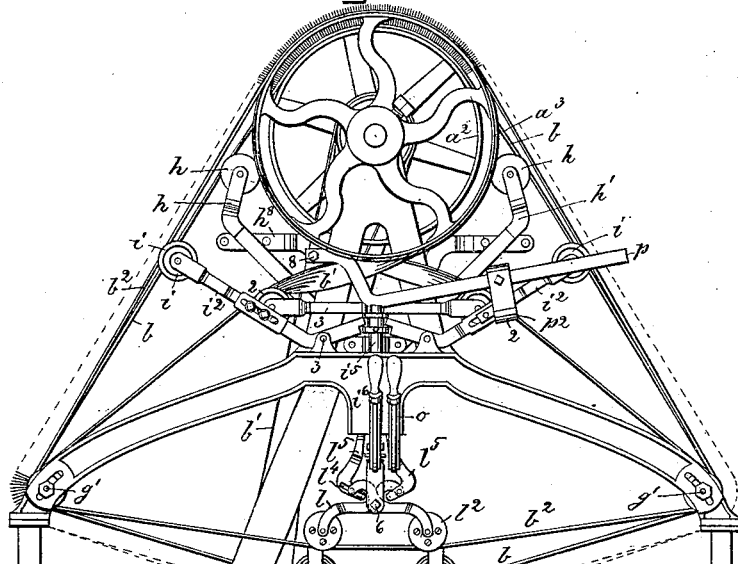
Figure 4:
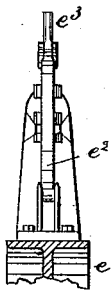
Figure 3:
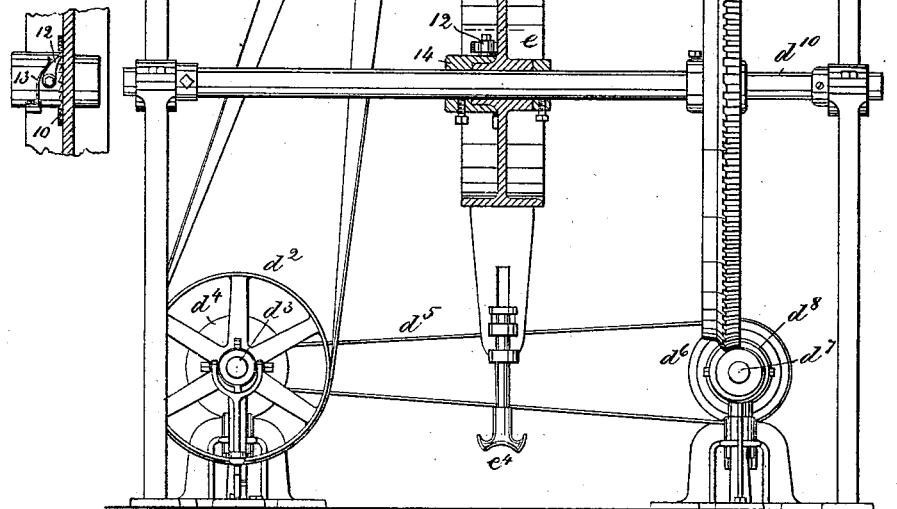
Figure 5:
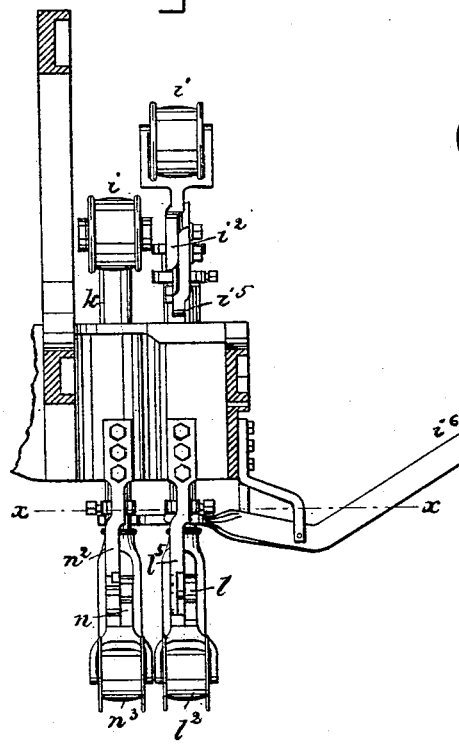
Figure 6:
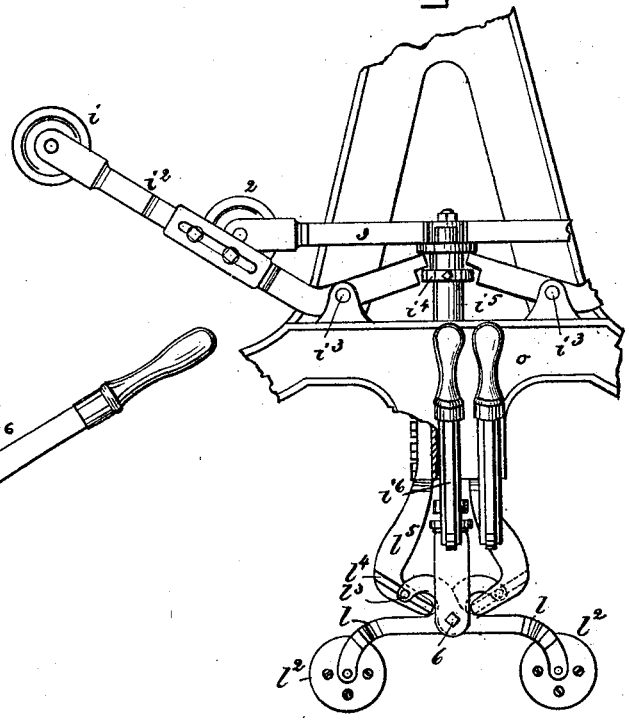
Figure 7:
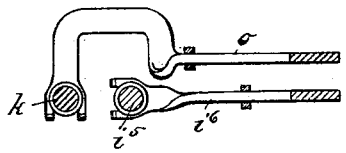
Figure 8:
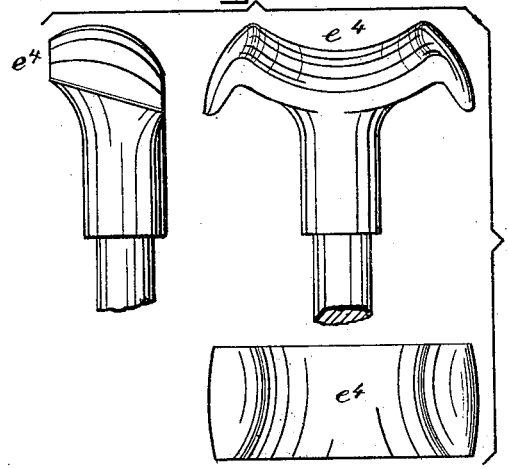

Figure 1 represents, in side elevation, a sole-finishing machine embodying our improvements, the belts being broken out to show part of the mechanism, which otherwise would be concealed. Fig. 2 is a front elevation of Fig. 1, the carrier for the series of jacks being shown in vertical section. Fig. 3 is a detail showing the connection between the carrier and its shaft. Fig. 4 is a detail of the jack. Figs. 5 and 6 are details, in side and front elevation, of the devices to hold and keep taut the belts and to govern their position with relation to the sole to be acted upon. Fig. 7 is a section of Fig. 5 on the line $x\ x$. Fig. 8 is a detail of the toe-rest of the jack to support the fore part of the shoe with a last in it; Figs. 9 and 10, details, in side and front elevation, of the devices for controlling the finishing or brush belt; Fig. 11, a detail showing the side of the gear $d^9$, provided with pattern-pins or projections to lift the rods $k\ i^5$ automatically through levers and lifting-rods shown in Figs. 11 to 13; Fig. 12, a top view of the levers shown in Figs. 11 and 13; Fig. 13, a view of Fig. 11, looking at it from the left, the toothed gear being partially in section; Fig. 14, an enlarged detail of the rod $i^5$ and its rollers to bear upon the belt $b^2$, the figure showing the belt-holding devices, which, with its operating devices, are entirely omitted from Figs. 1 and 2, to avoid confusion of the drawings; Fig. 15, a view of Fig. 14 from the left; Figs. 16 and 17, details of the belt-holding devices on a larger scale; Fig. 18, a top view of the link and devices for moving the belt-holder; Fig. 19, a partial side elevation of the carrier and jacks which we shall in practice use instead of the particular form of jack shown in Figs. 1, 2, and 4, the jack of Fig. 19 being the best form of jack known to us or that we have up to the present time been able to devise, and Fig. 20 is a section of Fig. 19 on the dotted line, shown looking from the left.

The main shaft $a$ of the machine, driven by a belt, $a'$, from any usual moving shaft, has upon it suitable drums $a^2\ a^3$, to receive the finishing or brush belt $b$, and one or more abrading or other belts, $b'\ b^2$, having their surfaces prepared coarse or fine, according to the work to be done by them. This shaft also carries a pulley, $d$, which, through a suitable driving-belt, $d'$, on the pulley $d^2$, drives the shaft $d^3$, it, in turn, having a set of pulleys, $d^4$, that, by belt $d^5$ on pulley $d^6$, rotates shaft $d^7$, it having on it a worm, $d^8$, in engagement with the worm-wheel $d^9$ on the shaft $d^{10}$, that has mounted upon it the carrier A for the boots and shoes, the soles of which are to be acted upon by the belts. The carrier-hub $e$ is not fixed to the shaft $d^{10}$, but, instead, is loose thereon. The hub of the drum $e$ at its side has a series of ratchet-teeth, 10, engaged by the pawl 12, fixed on the collar 14, secured to the shaft $d^{10}$, the rotation of the latter, by the aid of the pawl, turning the drum $e$ and permitting the same to be moved faster, if desired, by hand in a forward direction than if moved by the pawl and shaft positively. This loose connection enables the operator to turn the carrier more or less, as may be found necessary, in carrying the sole under the belts to be treated. This boot or shoe carrier is, as herein shown, composed of a central drum, $e$, having attached to its periphery one or more jacks, B, they being located at the proper distances apart. These jacks are in Fig. 1 shown as composed of two parts, one being an adjustable standard, $e^2$, with a pivoted heel-pin, $e^3$, to enter the usual hole in the last, and an adjustable toe-rest, $e^4$, to support the fore part of the shoe. In actual use we have found the jack shown in Fig. 1 to be very good, but prefer, and intend to hereafter use, the jack shown in Fig. 19, it being the best form of jack we have up to this time been able to devise.

Referring to Fig. 19, it will be seen that the toe-rest $e$ and heel-pin $e^3$ are connected with a bent lever, $m$, pivoted at $m'$ on an adjustable block, $m^2$, connected with the arm $m^3$ of the part $e$ of the carrier. The said figure shows two shoes jacked to be acted upon by the belts, and the two jacks are shown in the two extreme positions they may occupy. Each jack has a jack-locking device, $m^4$, (shown as a spring,) to engage a notch in hub $e$, (see Figs. 19 and 20,) and retain the lever $m$ and arm $m^3$ substantially in line, as at the extreme left of Fig. 19, or, by releasing the jack-locking device and grasping the lever $m$ by hand, the lever may be turned on its pivot $m'$ to enable the bottom of the sole to be moved up against the belt with any desired degree of force, and be retained substantially in horizontal position during the time it is being acted upon by the belt or belts, the action of the belts upon the bottom of the sole being thus extended and controlled as to time and degree.

The shafts $d^3$ and $d^7$ each have upon them a set of graduated belt or cone pulleys to receive the belt $d^5$, thus enabling the speed of the shaft $d^7$ to be increased or lessened at will. The pulley $d^2$ is a clutch-pulley, of usual construction, under the control of a treadle or foot-lever, $f$, whereby the shaft $d^7$, and consequently the carrier A, may either be rotated or left at rest, at the will of the operator.

The belt $b^2$ will in practice be covered or faced with glass or emery, or other usual equivalent material, to abrade and remove the material composing the bottom of the boot or shoe. The belt $b'$ may be of the same material, or it may be simply a woven textile belt, or a leather belt with a smooth surface to act upon and finish the bottom of the shoe. The belt $b$ is shown as a brush-belt, to polish the sole after the application to it of any usual polishing-gum or dressing-liquid, or material commonly used for giving to the bottom of the sole that finish known in the trade as "brushed bottoms."

The belt $b$, supported chiefly by the drum $a^2$, is extended about the rollers $g$, placed on shaft $g'$, one at each side of the main frame of the machine. This belt $b$ has within and bearing upon its inner side two suitable belt-tightening rollers, $h$, on levers $h'$, pivoted on a lug-plate, $h^2$, connected with the rod $h^3$, provided at its lower end with a fork, $h^4$, having upon it two rollers, $h^5$, that bear upon the belt $b$ at its lower portion, just above the point where the latter acts upon the sole, the said rollers $h^5$ being pressed down with a yielding pressure by means of adjustable spring $h^6$. The arms $h'$ are guided between pins $h^7$, or it may be in suitable notches in the bar $h^3$. The rollers $h$ move outward against the belt $b$ as the rollers $h^5$ are lifted, and vice versa. The rod $h^3$ may be lifted positively at the proper times through a lifting-rod, $h^9$, (see Fig. 9,) connected at its lower end with a suitable foot-treadle, $h^{10}$. (See Fig. 1.)

The belt $b^2$, supported chiefly by the drum $a^3$, is extended over belt-tightening rollers $i$ on adjustable lever-arms $i^2$, pivoted at $i^3$, and so connected at their short ends with a head or collar, $i^4$, on the rod $i^5$ as to be moved positively about their pivots when the said rod is raised or lowered, either by hand, through the agency of the hand-lever $i^6$, or by a lifting-rod, as will be referred to in Figs. 11 to 13. The rod $i^5$ has at its lower end a pivot, 6, for the two levers $l$, each lever having at its outer end a roller, $l^2$, to bear upon the inner portion of the belt $b^2$ just above or near where it acts upon the sole. These levers $l$ are each shown as provided with a pin, $l^3$, to enter a groove, $l^4$, in an arm, $l^5$, so that as the rod $i^5$ is raised and lowered the said levers will be turned on their pivots 6 to move the rollers $l^2$ from or toward each other, the said arms $l^5$, their grooves, and the pins or the levers constituting the roller-spreading mechanism.

The belt $b'$ is also herein shown as supported chiefly by the drum $a^3$. This belt is crossed, as designated at Fig. 2, and extended over two belt-tightening rollers, 2, at the ends of an arm, 3, connected with the rod $k$, having at its lower end a pivot, like the one 6, for its two levers, $n$, like the levers $l$, each lever $n$ being provided with a pin to enter a grooved part of an arm, $n^2$, like the arm $l^5$ in Fig. 6. These levers $n$ each have a roller, $n^3$, like the roller $l^2$, to act upon the belt $b'$ at its inner side, near where the outer face of the said belt acts against the bottom of the sole.

It is deemed essential for the best operation of this machine that the two pairs of rollers $l^2$ and $n^3$ be supported and actuated in such manner that the rollers of each pair may be moved toward and from each other as they are depressed more or less upon the belts $b^2$ or $b'$ below them, that the said belts may be forced properly down closely against the bottom of the sole entirely across it, no matter what may be its width or curvature, thus enabling the belt or belts to act upon the sole from edge to edge, both along the ball of the sole and into the shank.

The rod $k$ may be lifted or depressed by the hand-lever $o$. (Shown in Figs. 2 and 4.) One or both of the rods $k$ $i^5$ may be kept pressed down by a lever, $p$, pivoted at 8 and weighted at $p^2$.

To automatically lift the rods $k$ $i^5$ to place the belts carried by their connected rollers upon the sole, and then to lift them from the sole at the proper times upon the heel, we have provided the gear $d^9$ with a series of pattern pins or projections, 20 21, to act upon the levers 22 and 23 pivoted upon the standard 24, and adjustably connected at their slotted forward ends with the links 25 and 26, attached, respectively, with the rods $k$ and $i^5$, before described. The rotation of the gear $d^9$ in the direction of the arrows, Fig. 11, will cause the pin 20 to strike the lever 22 and lift the link 26 and rod $i^5$, it affecting the front belt, $b^2$, toward which the breast of the shoe-heel is being moved, lifting the said rod and its belt high enough to place the belt on the top of the heel. Next the pin $n$ acts on the lever 23 and lifts the link 25, rod $k$, and belt $b'$ as high as the level of the heel. During the further rotation of the carrier A with the shaft $d^{10}$ the two belts $b^2$ and $b'$ pass off the heel, and as soon as the toe of a shoe on a following jack arrives near the belt $b^2$ the pin 21 acts upon the levers 22 and 23, and lifts them and their links and rods $i^5$ and $k$ to place the belts affected by them upon the bottom of the sole at the toe.

The belt $b^2$ between the rollers $l^2$, to do the best work must be made to conform to the surface of the sole, so as to bear upon and abrade it uniformly from edge to edge. With a belt not held or pressed down between the rollers $l^2$ we have found, in practical work, that under some circumstances a portion of the central part of the sole was not properly worn or ground away, and to overcome the objection and approximate the action of the belt as nearly as possible to what would be the result if a piece of glass or emery-paper were held in the hand of the operator and rubbed hard upon the bottom of the sole, we have added between the said rollers what we herein denominate as a belt-holder, its function being to bear upon the upper side of the belt substantially centrally between the rollers $l^2$ and substantially above the center line of the bottom of the sole. This holder is herein shown as composed of three rollers, 27 28 29. The yoke 30, holding the roller 28, is by the pivot 31 connected with the lower ends of toggle-levers 32 33, pivoted at 6 and held together by a spiral spring, 34. The ears or yokes which receive the journals of the rollers 27 and 29 are supported from the ends of a spring-plate, 35, connected centrally with the yoke 30, and above this spring-plate is a spring, 36, to assist in keeping the rollers 27 and 29 down in a yielding manner upon the belt. If this holder be kept stationary the belt is in some instances liable to wear away the sole more at one place than at another; so we have provided means for reciprocating the said holder in the direction of the length of the belt and transversely with reference to the sole, the said holder in its changing position bearing the belt against the sole to approximate the hand-action alluded to. To move this holder we have added to the end of one of the rollers, $g^x$, over which the belt $b^2$ is passed, an eccentric, 37, which by an adjustable link, 38, reciprocates the holder, as described.

In Fig. 14 we have shown a modified form of connection between the levers $i^2$ and the rod $i^5$, such connection consisting of pins 39 on the said levers, that enter slots or grooves in the head $i^4$, fixed to the rod $i^5$, the rod and its head thus moving the levers $l$ and $i^2$ positively.

Instead of using the toggle-levers 32 33 and spring 34 to keep the holder down to its work, we may connect with the arms $l^5$, such as shown in Fig. 6, or with some other rigid part of the machine, a spring to bear directly upon the link 38 and keep the holder down with the proper force.

The belt $b'$ will be provided with a holder to operate upon it, as described, for the belt $b^2$; but in the drawings we have considered it unnecessary to show such apparatus, as it would be just the same as that already described.

We claim—

1. An organized sole-finishing machine to operate upon the bottoms of the soles of boots and shoes, it being composed, essentially, of a carrier and series of jacks, upon which the boots or shoes are mounted and held, and of a belt or belts arranged, substantially as described, to act upon and abrade the bottom of the sole.

2. In an organized machine to finish the bottoms of the soles of boots and shoes, a carrier and series of jacks thereon to hold the boots and shoes the soles of which are to be finished combined with a brush-belt arranged, substantially as described, to brush the bottoms of the said soles, substantially as set forth.

3. In a machine to operate upon the soles of boots and shoes, a carrier and a jack pivoted thereon to be tipped in the direction of the length of the sole, combined with an endless abrading or polishing belt, substantially as described.

4. In a machine to abrade and to polish the soles of boots and shoes, a carrier and a series of jacks combined with an abrading and with a polishing-belt arranged to operate successively upon the bottom of the sole, substantially as described.

5. In a machine to abrade the bottoms of boot and shoe soles, a belt and rollers to support it, and a holder to bear upon the belt, as described, and keep it down uniformly to its work, substantially as described.

6. In a machine to abrade the bottoms of boots and shoes, a jack to hold the shoe and a belt to act upon and abrade the bottom of the sole, the said belt being extended about rollers made movable in the direction of the width of the sole, to adapt the belt to soles of varying widths and degrees of curvature, substantially as described.

7. In an organized machine to abrade the bottoms of boot and shoe soles, the following means—viz: a jack to hold the boot and shoe, an endless traveling abrasive or finishing belt extended about guide-rollers, belt-tighteners to act upon the inner surface of the belt, and a pair of movable rollers to bear upon the belt and keep it at the proper level with relation to the plane occupied by the sole of the shoe at the part being acted upon by the belt, as set forth.

8. The endless traveling belt, rollers to bear upon the inner side of that part of it in contact with the bottom of the sole, combined with a vertically-movable rod with which to raise and lower the said rollers and with belt-tighteners connected with the said rod and rollers, to be automatically actuated positively and in unison with the said rod and rollers to keep the belt taut in all its positions.

9. In a machine to abrade the bottoms of boot and shoe soles, the jack and the belt, drums and rollers to drive and support it, as described, combined with a movable holder to bear upon the belt, the said holder being composed of rollers to act upon the belt and hold it down upon the bottom of the sole, as set forth.

10. In a machine to abrade the bottoms of boot and shoe soles, the endless traveling belt supported upon and driven by a drum, and rollers to act upon its inner side and keep the acting face of the belt upon the sole notwithstanding variations in its width and curvature, and the rod carrying the said rollers, combined with a gear, pattern pins or projections thereon, and means between the said pattern-pins and rod to automatically raise and lower the rollers which hold the belt to its work.

11. In a machine to operate upon the bottoms of boot and shoe soles, the endless traveling belt combined with the rotating shaft $d^{10}$ and a rotating carrier having a series of jacks, the carrier being connected with the said shaft by a pawl-and-ratchet connection, to enable the carrier to be turned forward independently by hand, substantially as described.

12. In a machine for finishing the bottoms of boots and shoes, a jack to hold and move the boot or shoe transversely to the movement of the belt combined with an endless rotating belt and rollers to act upon it, having movements imparted to them toward and from each other to hold the belt down upon the sole near its edges notwithstanding variations in width and longitudinal curvature along the fore part and shank of the sole, substantially as set forth.

In testimony whereof we have signed our names to this specification in the presence of two subscribing witnesses.

JAMES A. AMBLER.
ARTEMAS C. AMBLER.

Witnesses:
ARTHUR REYNOLDS,
G. W. GREGORY.